United States Patent [19]
Silvey

[11] Patent Number: 6,145,837
[45] Date of Patent: *Nov. 14, 2000

[54] THREE-DIMENSIONAL GEOMETRIC PUZZLE

[75] Inventor: Linda Silvey, Sherman Oaks, Calif.

[73] Assignee: A. Daigger and Company, Inc., Vernon Hills, Ill.

[ * ] Notice: This patent is subject to a terminal disclaimer.

[21] Appl. No.: 09/143,499

[22] Filed: Aug. 28, 1998

[51] Int. Cl.[7] ........................................................ A63F 9/12
[52] U.S. Cl. ........................................................ 273/157 R
[58] Field of Search ............................... 273/153 R, 156, 273/157 R

[56] References Cited

U.S. PATENT DOCUMENTS

| | | |
|---|---|---|
| D. 238,698 | 2/1976 | Cook . |
| 260,594 | 7/1882 | Mehner . |
| D. 262,388 | 12/1981 | Bogue . |
| D. 340,091 | 10/1993 | Miller . |
| D. 413,361 | 8/1999 | Silvey ..................... D21/478 |
| 1,173,298 | 2/1916 | Montessori . |
| 1,430,557 | 10/1922 | Jervis ..................... 273/156 X |
| 1,565,099 | 12/1925 | Nierodka . |
| 1,656,117 | 1/1928 | Joseph . |
| 2,885,207 | 5/1959 | Wormser . |
| 3,637,217 | 1/1972 | Kent . |
| 4,114,877 | 9/1978 | Goldfarb et al. . |
| 4,298,200 | 11/1981 | Kanbar . |
| 4,445,865 | 5/1984 | Sellon . |
| 4,522,404 | 6/1985 | Di Gregorio ......................... 273/157 R |
| 4,723,382 | 2/1988 | Lalvani . |
| 4,913,436 | 4/1990 | Li . |
| 5,385,473 | 1/1995 | Veltman . |
| 5,660,387 | 8/1997 | Stokes ................................ 273/157 R |
| 5,747,430 | 5/1998 | Chester . |
| 5,873,729 | 2/1999 | Aghevli . |

OTHER PUBLICATIONS

Tangrams–330 Puzzles; Ronald C. Read; Dover Publications, Inc.; p. 1, original Tangrm, Jan. 1965 1 page.
Catalog, Math "Models for Geometry" pp. 84–85.

*Primary Examiner*—Raleigh W. Chiu
*Attorney, Agent, or Firm*—Larry L. Saret; Laff, Whitesel & Saret, Ltd.

[57] ABSTRACT

The present invention provides a three-dimensional geometric puzzle having a cube element, five triangular prism elements and a parallelepiped element. Each one or all of the elements of the puzzle are capable of being oriented such that they have a thickness equal to the length of an edge of the face of the cube element. The elements can also be juxtaposed in a predetermined fashion to form various geometric solids, such as a parallelepiped having a square face and a height equal to the length of a side of an edge of the cube element.

17 Claims, 2 Drawing Sheets

THREE-DIMENSIONAL GEOMETRIC PUZZLE

FIELD OF THE INVENTION

The present invention relates to educational manipulatives, and more particularly to three-dimensional geometric puzzles.

BACKGROUND OF THE INVENTION

A tangram is a two-dimensional, Chinese dissection puzzle made by cutting a square into five triangles (two identical large triangles, one medium triangle, and two identical small triangles), a square, and a rhomboid, and using these pieces (known as tans) to form various figures and designs. Tangrams can be any size because the length of the side of the square from which the tans are cut can vary.

Manipulative puzzles, such as tangrams, can make abstract geometric ideas and planar concepts concrete and, thus, can help students deepen their understanding of mathematics. However, three-dimensional geometric and spatial concepts, such as volume and stacking cannot be readily demonstrated using two-dimensional tangrams or manipulative geometric puzzles that have a thickness of a quarter of an inch or less.

Moreover, because two-dimensional tangrams and manipulative geometric puzzles that have a thickness of a quarter of an inch or less are usually made of paper or a hard plastic, they have pieces which are difficult to grasp, situate and maneuver by people who have dexterity difficulties.

SUMMARY OF THE INVENTION

The present invention provides a three-dimensional geometric puzzle that greatly expands the repertoire of mathematics, geometry and design teaching tools. Usage of the three-dimensional geometric puzzle of the present invention allows for, in addition to the replication of the pedagogical aspects of two-dimensional geometric puzzles, the ability to illustrate spatial mathematical concepts and formulae that are not demonstrable with two-dimensional geometric puzzles.

In an exemplary embodiment, a three-dimensional geometric puzzle is provided that includes a cube element, five triangular prism elements and a parallelepiped element that can be juxtaposed in a predetermined manner to form a parallelepiped having a square face and a thickness equal to an edge of the cube element. The five triangular prism elements in the exemplary embodiment consist of a first triangular prism element, a second triangular prism element having a volume greater than the first triangular prism element, a third triangular prism element having a volume greater than the second triangular prism element, a fourth triangular prism element identical to the first triangular prism element and a fifth triangular prism element identical to the third triangular prism element.

The elements of the three-dimensional geometric puzzle of the present invention can be made of a material that is resilient such as compressible foam rubber. The elements can also have a thickness greater than or equal to one inch to enable simple grasping, maneuvering and stacking of the elements. Moreover, the elements can be differently colored or multi-colored in order to readily differentiate the elements, and to visually stimulate users of the puzzle.

BRIEF DESCRIPTION OF THE DRAWINGS

A more complete understanding of the present invention and the attendant advantages and features thereof will be more readily understood by reference to the following detailed description when it is considered in conjunction with the accompanying drawings, wherein.

DETAILED DESCRIPTION

Figure 1:
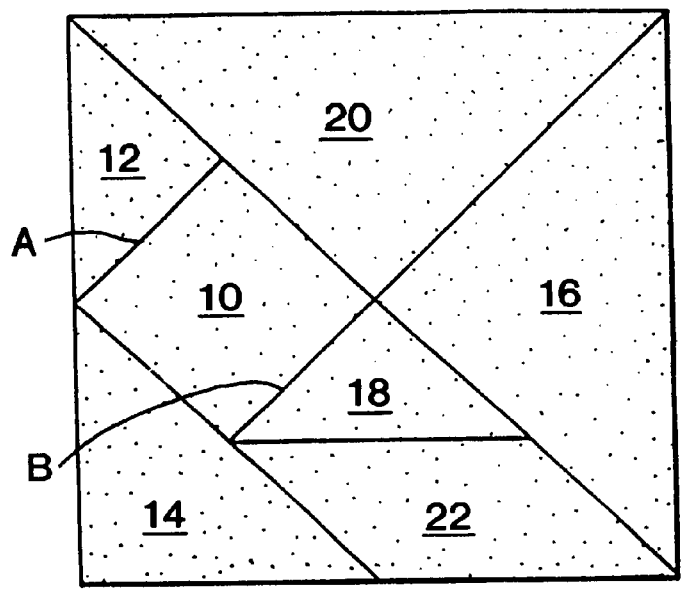
FIG. 1 is a plan view of a face of a parallelepiped assembly of the three-dimensional geometric puzzle of the present invention.

Referring to FIG. 1, a square face of a parallelepiped assembly of a three-dimensional geometric puzzle of the present invention is shown. The puzzle has seven three-dimensional elements: a cube element 10, a first triangular prism element 12, a second triangular prism element 14, a third triangular prism element 16, a fourth triangular prism element 18, a fifth triangular prism element 20 and a parallelepiped element 22. In the illustrated embodiment, the first triangular prism element 12 is identical to the fourth triangular prism element 18 and the third triangular prism element 16 is identical to the fifth triangular prism element 20.

Examination of the face of the parallelepiped assembly of the three-dimensional geometric puzzle depicted in FIG. 1 reveals that there are certain planar geometric relationships that exist among the faces of the elements. For example, the cube element 10 has twelve equal edges, four of which are shown in FIG. 1 and two of which are noted in FIG. 1 as A and B. Edge A of the cube element 10 is completely shared with, and thus is equal to, an edge of the first triangular prism element 12, and edge B of the cube element is completely shared with, and thus is equal to, an edge of the fourth triangular prism element 18. Because the first triangular prism element 12 and the fourth triangular prism element 18 are identical and have right-angled isosceles triangle faces, and because edges A and B correspond to edges of the first triangular prism element and the fourth triangular prism element, respectively, and are not their hypotenuses, the area of each of the right-angled isosceles triangle faces of the first triangular prism element and the fourth triangular prism element of the embodiment of the present invention depicted in FIG. 1 are each equal to one-half of the area of a face of the cube element 10.

Additionally, the areas of the faces of the other elements of the embodiment of the three-dimensional puzzle pictured in FIG. 1 are also related to the area of a face of the cube element 10. For example, the areas of the triangular faces of the second triangular prism element 14 and the parallelogram faces of the parallelepiped element 22 are each equal to the area of a face of the cube element 10. Also, the area of the triangular faces of the third triangular prism element 16 and the area of the triangular faces of the fifth triangular prism element 20 pictured in FIG. 1 are each equal to twice the area of a face of the cube element 10.

Although the faces of the elements of the parallelepiped assembly of the three-dimensional geometric puzzle shown in FIG. 1 have areas that are either equal to the area of the cube element 10 or have a binary multiple relationship to the area of the cube element (i.e.—equal to one-half of the area of the cube element, equal to two times the area of the cube element, etc.), the present invention contemplates having elements with different area relationships to the area of the cube element.

Figure 2:
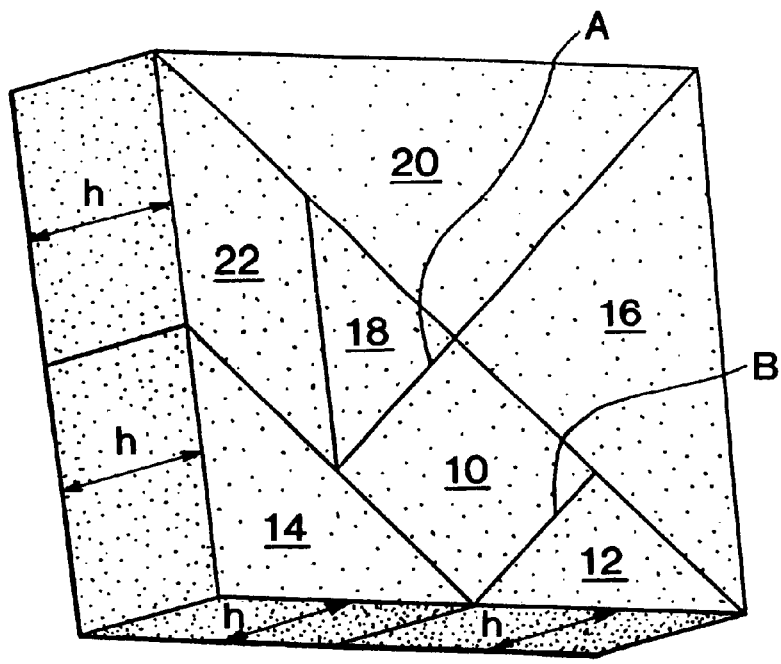
FIG. 2 is a perspective view of the FIG. 1 parallelepiped assembly of the three-dimensional geometric puzzle of the present invention.

Referring now to FIG. 2, the parallelepiped assembly of the three-dimensional geometric puzzle of FIG. 1 is depicted in three-dimensional form. The parallelepiped assembly is pictured as having a uniform thickness "h" wherein each element is positioned so as to have a height equal to the thickness "h" of the parallelepiped assembly. Thus, the thickness "h" of the parallelepiped assembly is equal to the measurement of an edge of the cube element 10.

Five of the elements of the embodiment of the present invention shown in FIGS. 1–2 are triangular prisms. Triangular prisms have two triangular faces that are parallel and identical; thus, a triangular face of each of the five triangular prism elements (first triangular element 12, second triangular element 14, third triangular element 16, fourth triangular element 18 and fifth triangular element 20) that is shown in FIGS. 1–2 will have a corresponding identical, parallel face (not pictured). Moreover, parallelepipeds have six faces that are parallel in identical, opposite pairs; therefore, the parallelogram face of the parallelepiped element 22 that is shown in FIGS. 1–2 will have a corresponding identical, parallelogram face (not pictured).

Because the seven elements of the puzzle have a uniform thickness "h" that is equal to an edge of the cube element 10, certain volumetric relationships exist between the cube element and the other six elements of the puzzle. Specifically, the volumes of the first triangular prism element 12 and the fourth triangular prism element 18 are each equal to one half of the volume of the cube element, and the volumes of the second triangular prism element 14 and the parallelepiped element 22 are each equal to the volume of the cube element 10, and the volume of the third triangular prism element 16 and the fifth triangular prism element 20 are each equal to twice the area of the face of the cube element 10.

The elements of the three-dimensional geometric puzzle of FIG. 2 should all have thicknesses adequate to facilitate the grasping and maneuvering of the elements. In order to further facilitate the grasping and maneuvering of the elements of the puzzle, the elements should be also made of a resilient material such as compressible foam rubber. Moreover, the material of which the elements are chosen to be made and the chosen thicknesses of the elements should enable the elements to be readily stackable on top of one another. In the illustrated embodiment, the elements each have uniform thicknesses of about one and three-eighth inches. However, the elements can be somewhat thinner or considerably thicker while still retaining their unique functionality.

The three-dimensional aspect of the elements of the puzzle of the present invention, as well as the ability to stack the elements, allows the elements to be juxtaposed into a wide variety of geometric solids filling polygonal outlines in addition to the parallelepiped assembly shown in FIG. 2. Specifically, the usage of two or more identical sets of the seven elements of the puzzle of the present invention enables the elements to be juxtaposed and/or stacked into complex geometric solids including animal-shaped polygonal outlines, letter-shaped polygonal outlines, number-shaped polygonal outlines and object-shaped polygonal outlines (including house-shaped and rocket-shaped polygonal outlines). The ability to form such complex yet recognizable solids will allow users of the three-dimensional geometric puzzle of the present invention to be entertained and amused while learning about mathematics and geometry.

The elements of the puzzle of the present invention can possess other features in order to further entertain and pique the interest of users. For example, the elements of the puzzle could be differently-colored or multi-colored. Specifically, each element could be one color, that color being different than the color of any of the other elements. Alternatively, only the non-identical elements of the puzzle could be differently-colored, or the cube element(s), the triangular prism element(s) and the parallelepiped element(s) of the puzzle could each be the same color, but a different color than the differently-shaped elements. Having elements of different colors will allow for the additional amusing and educational challenges to users of placing specific colored elements either adjacent or not adjacent to one another when juxtaposing the three-dimensional geometric puzzle.

Figure 3:
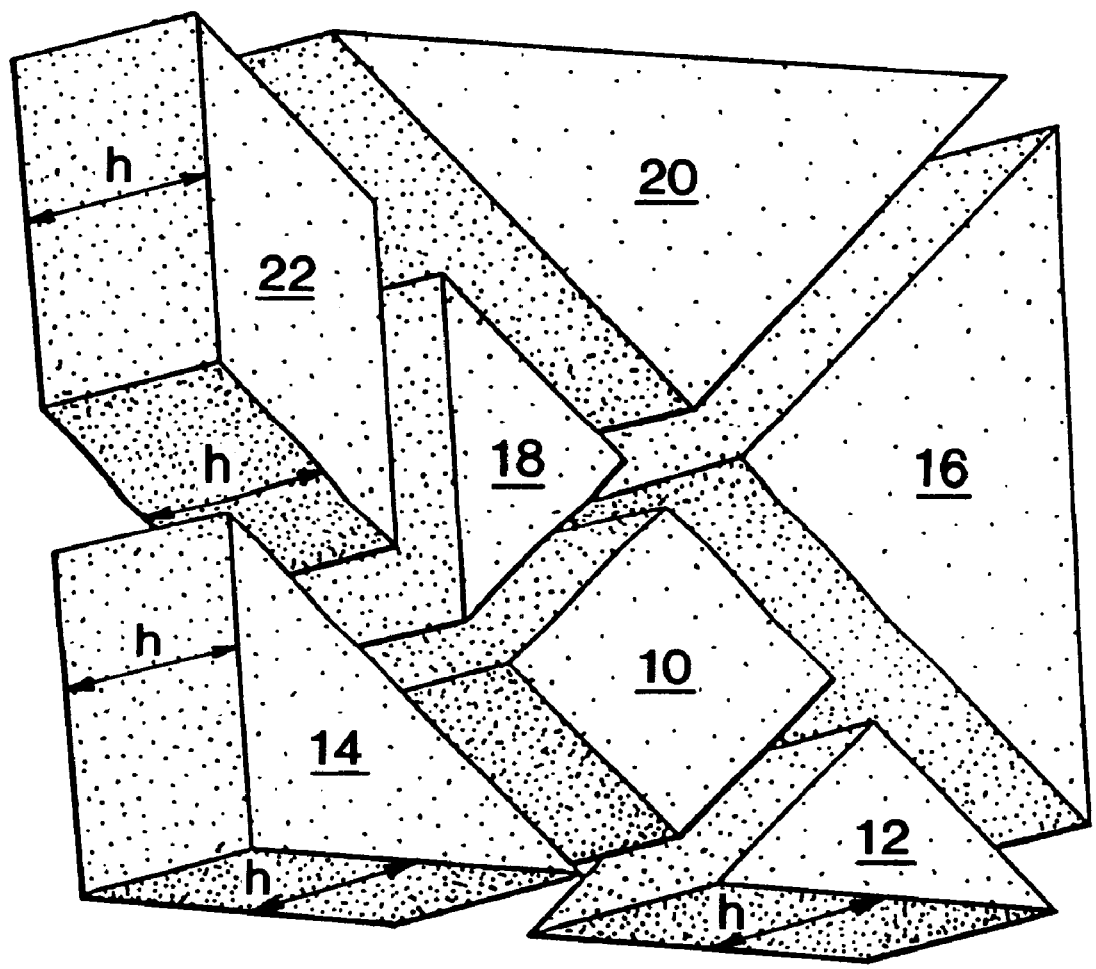
FIG. 3 is an exploded view of the seven elements of the three-dimensional puzzle of FIG. 1.

Referring now to FIG. 3, the seven elements of the three-dimensional geometric puzzle are individually shown. The parallel faces of the seven elements that are each of uniform height "h" have the same area relationships as the faces of the elements of the assembled view of the elements of FIG. 1, and these seven elements also have the same volumetric relationships as the elements of FIG. 2. It is not necessary, however, for the elements of the puzzle of the present invention to have the same area and volume relationships to the cube element 10 as noted in FIGS. 1–2; the elements could have greater thicknesses and different areas and volumes.

Nevertheless, in order to be able to properly illustrate three-dimensional geometric concepts and formulae, the seven elements should all have the same thickness and one element should always be a cube with each edge of the cube being equal in measurement to the thickness of the other elements. However, when more than one set of seven elements are used in conjunction, each set of seven elements, although having uniform thicknesses among the seven elements, could have different thicknesses than the other set(s) of seven elements.

Furthermore, a teaching kit can be provided whereby a single three-dimensional puzzle or a plurality of three-dimensional geometric puzzles of similar or different thicknesses and/or colors in accordance with the present invention are provided along with items including, but not limited to, teaching and exercise books, computer software and overhead transparencies. Moreover, the present invention is contemplated as being adaptable as an interactive computer software program wherein geometric shapes and/or formulae could be illustrated and/or manipulated by a computer software user.

What is claimed is:

1. A three-dimensional tangram comprising:
    a resilient cube element having a thickness and a volume and having six identical faces, each of the identical faces having four identical edges, the edges each being at least one inch in length;
    a first resilient triangular prism element having two faces identical to one of the six faces of the cube element and a thickness identical to the thickness of the cube element, and having two right angled isosceles triangle faces, and having a volume equal to one-half of the volume of the cube element;
    a second resilient triangular prism element having two right angled isosceles triangle faces and a thickness identical to the thickness of the cube element, and having a volume equal to the volume of the cube element;
    a third resilient triangular prism element having two right angled isosceles triangle faces and a thickness identical to the thickness of the cube element, and having a volume equal to twice the volume of the cube element;

a fourth resilient triangular prism element identical to the first triangular prism element;

a fifth resilient triangular prism element identical to the third triangular prism element; and a resilient parallelepiped element having two faces identical to one of the six faces of the cube element and a thickness identical to the thickness of the cube element, and having volume equal to the volume of the cube element.

2. A three-dimensional tangram comprising:

a cube element having a volume and having six identical faces, each of the identical faces having four identical edges;

a first triangular prism element having two faces identical to one of the six faces of the cube element, and having a volume equal to one-half of the volume of the cube element;

a second triangular prism element having a volume equal to the volume of the cube element;

a third triangular prism element having a volume equal to twice the volume of the cube element;

a fourth triangular prism element identical to the first triangular prism element;

a fifth triangular prism element identical to the third triangular prism element; and a parallelepiped element having two opposite, parallel faces identical to one of the six faces of the cube element, and having a volume equal to the volume of the cube element, wherein the elements are capable of being juxtaposed in a predetermined manner to form a parallelepiped figure, the parallelepiped figure having a square face and having a thickness identical to the thickness of the cube element.

3. The three-dimensional tangram of claim 2, wherein the elements are capable of being juxtaposed in a predetermined manner to form a parallelepiped figure having a thickness equal to a edge of the cube element.

4. The three-dimensional tangram of claim 2, wherein the first triangular prism element, the second triangular prism element, the third triangular prism element, the fourth triangular prism element and the fifth triangular element are each right-angled isosceles triangular prism elements.

5. The three-dimensional tangram of claim 2, wherein each of the edges of the cube element is greater than one inch in length.

6. The three-dimensional tangram of claim 2, wherein the elements are resilient.

7. The three-dimensional tangram of claim 6, wherein the elements are made of foam rubber.

8. The three-dimensional tangram of claim 2, wherein the colors of at least two of the elements are different.

9. A three-dimensional tangram comprising a cube element, a parallelepiped element and five triangular prism elements each element having a thickness equal to an edge of the cube element, the elements being juxtaposable in a predetermined manner to form a parallelepiped figure having a thickness equal to an edge of the cube element.

10. The three-dimensional tangram of claim 9, wherein the parallelepiped figure has a square face.

11. The three-dimensional tangram of claim 9, wherein the five triangular prism elements consist of:

a first triangular prism element;

a second triangular prism element having a volume greater than the first triangular prism element;

a third triangular prism element having a volume greater than the second triangular prism element;

a fourth triangular prism element identical to the first triangular prism element; and a fifth triangular prism element identical to the third triangular prism element.

12. The three-dimensional tangram of claim 11, wherein the first triangular prism element, the second triangular prism element, the third triangular prism element, the fourth triangular prism element and the fifth triangular element each have a set of two opposite identical, parallel, right-angled, isosceles triangle faces.

13. The three-dimensional tangram of claim 9, wherein the parallelepiped element has a pair of opposite and parallel faces that are each identical to one of the six faces of the cube element.

14. The three-dimensional tangram of claim 9, wherein each of the sides of the cube element is greater than one inch in length.

15. The three-dimensional tangram of claim 9, wherein the elements are resilient.

16. The three-dimensional tangram of claim 15, wherein the elements are made of foam rubber.

17. The three-dimensional tangram of claim 9, wherein the colors of at least two of the elements are different.

\* \* \* \* \*